US011030077B1

(12) United States Patent
Kwan et al.

(10) Patent No.: US 11,030,077 B1
(45) Date of Patent: Jun. 8, 2021

(54) FRAMEWORK FOR TESTING AND VALIDATING CONTENT GENERATED BY APPLICATIONS

(71) Applicant: Amazon Technologies, Inc., Seattle, WA (US)

(72) Inventors: Yuk Lun Patrick Kwan, Bellevue, WA (US); Gary Rittinger, Kent, WA (US); Minh Quoc Huy Cao, Bothell, WA (US); Mehdi Ali Mirza, Seattle, WA (US); Ting-Jui Ho, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 163 days.

(21) Appl. No.: 16/448,955

(22) Filed: Jun. 21, 2019

(51) Int. Cl.
*G06F 11/00* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC ............. G06F 11/3684; G06F 11/3688; G06F 11/3692; G06F 11/3664
See application file for complete search history.

(56) References Cited

U.S. PATENT DOCUMENTS

| | | | |
|---|---|---|---|
| 10,747,651 B1* | 8/2020 | Vanderwall | G06F 11/3692 |
| 2005/0060317 A1* | 3/2005 | Lott | G06Q 10/00 |
| 2006/0236254 A1* | 10/2006 | Mateescu | G06F 8/75 |
| | | | 715/762 |
| 2006/0248506 A1* | 11/2006 | Luo | G06F 8/38 |
| | | | 717/104 |

* cited by examiner

*Primary Examiner* — Charles Ehne
(74) *Attorney, Agent, or Firm* — Nicholson De Vos Webster & Elliott, LLP

(57) ABSTRACT

Techniques for testing and validating content generated by applications provided by a provider network are described. A test execution service is disclosed that provides users with a framework for testing the functionality of an application provided by a provider network. A content validation service is disclosed that provides users with a framework for validating content generated by the application by orchestrating the execution of objects to be validated as part of validating content generated by the application. The content validation service generates a validation result for a user by comparing expected data values corresponding to an object to be validated with corresponding actual data values. The disclosed content validation service provides users with the ability to define objects and object definitions for objects to be validated as part of validating content generated by applications provided by the provider network.

20 Claims, 9 Drawing Sheets

```
"TEST SPECIFICATION" : [
{
"ACTION": "CREATE ACCOUNT",
"INPUTS":       {
        "MARKETPLACEGROUP": "A1"
        }
}
{
"ACTION": "CREATE PAYMENT INSTRUMENT",
"INPUTS":       {
        "ACCOUNTINDEX": "0",
        "PAYMENTINSTRUMENTTYPE": "INVOICE"
        }
}

{
"ACTION": "CREATE SUBSCRIPTION",
"INPUTS":       {
        "ACCOUNTINDEX": "0",
        "OFFERCODE": "49010305",
        "SHOULDSWAPIFPOSSIBLE": "TRUE"
        }
}

{
"ACTION": "ADD USAGE",
"INPUTS":       {
        "ACCOUNTINDEX": "0",
        "PRODUCTCODE": "A1APIGATEWAY",
        "USAGEVALUE": "4000",
        "USAGEOPERATION": "APIGATEWAYREQUEST",
        "IMMEDIATEINGESTION": "TRUE",
        "PRODUCTTYPE": "METERED",
        "CLIENTPRODUCTCODE": "A1APIGATEWAY",
        "USAGETYPE": "APIGATEWAYCACHEUSAGE 237GB",
        "STARTTIME": "2019-04-01 01:00:00Z",
        "ENDTIME" : "2019-04-01 02:00:00Z"
        }
}
{
"ACTION": "BILL RUN",
"INPUTS":       {
        "ACCOUNTINDEX": "0",
        "BILLINGMONTH": "2019-04,"
        }
}
#CONTENT VALIDATION BLOCK
{
"ACTION": "CONTENT VALIDATION",
"OBJECT TYPE: "INVOICE OBJECT",
"INPUTS":       {
        "BILLAMOUNT": "20919.00",
        "CHARGEAMOUNT": "19000.00",
        "TAXAMOUNT": "1919.00",
        "CREDITAMOUNT": "0.00",
        "DESCRIPTION": "ANNIVERSARY BILL",
                }
}
```

TEST SPECIFICATION 200

ACTIONS 202

CONTENT VALIDATION BLOCK 204

*FIG. 2*

| OBJECT TYPE | OBJECT DEFINITION | SERVICE IP ADDRESS | API DEFINITION | MAPPING INFORMATION |
|---|---|---|---|---|
| INVOICE OBJECT | {BILL AMOUNT, CHARGE AMOUNT, TAX AMOUNT, CREDIT AMOUNT, DESCRIPTION} | 192.0.2.1 | getBillIdWithAmount | BILL AMOUNT = {BILL AMT, BILL VALUE) |
| ACCOUNT OBJECT | {ACCOUNT ID, ACCOUNT CREATION DATE, ACCOUNT INFORMATION} | 192.0.2.2 | getAccountInfoByAccId | ACCOUNT CREATION DATE = {ACC CREATE DATE} |
| SUBSCRIPTION OBJECT | {ACCOUNT ID, OFFER ID, OFFER CODE, BEGIN DATE, END DATE} | 192.0.2.5 | getSubcriptionInfoByAccId | ACCOUNT IDENTIFIER = {ACC ID} |

*FIG. 3*

| ATTRIBUTE | EXPECTED VALUE | ACTUAL VALUE | VALIDATION RESULT | COMMENTS |
|---|---|---|---|---|
| BILL TYPE | ANNIVERSARY | ANNIVERSARY | PASSED | NONE |
| ACCOUNT ID | 37408 | 37408 | PASSED | NONE |
| INVOICE ID | A1 | A1 | PASSED | NONE |
| BILL AMOUNT | 20919.00 | 20919.00 | PASSED | NONE |
| CHARGE AMOUNT | 19001.00 | 19000.00 | FAILED | CHARGE AMOUNT DOES NOT MATCH EXPECTED: 19001.00 ACTUAL:19000.00 |
| TAX AMOUNT | 1919.00 | 1919.00 | PASSED | NONE |
| CREDIT AMOUNT | 0.00 | 0.00 | PASSED | NONE |

| INDEX | DESCRIPTION | VALIDATION RESULT | VALIDATION REPORT |
|---|---|---|---|
| 1 | ANNIVERSARY BILL | FAILED | PASSED: 6 FAILED: 1 |
| 2 | SUBSCRIPTION BILL | PASSED | DETAILS |
| 3 | ANNIVERSARY BILLS > 20000.00 | PASSED | DETAILS |
| 4 | ANNIVERSARY BILLS > 20000.00 | PASSED | DETAILS |
| 5 | ALL BILLS | PASSED | DETAILS |

502

400

| ATTRIBUTE | EXPECTED VALUE | ACTUAL VALUE | VALIDATION RESULT | COMMENTS |
|---|---|---|---|---|
| BILL TYPE | ANNIVERSARY | ANNIVERSARY | PASSED | NONE |
| ACCOUNT ID | 37408 | 37408 | PASSED | NONE |
| INVOICE ID | A1 | A1 | PASSED | NONE |
| BILL AMOUNT | 20919.00 | 20919.00 | PASSED | NONE |
| CHARGE AMOUNT | 19001.00 | 19000.00 | FAILED | CHARGE AMOUNT DOES NOT MATCH - EXPECTED: 19001.00 ACTUAL: 19000.00 |
| TAX AMOUNT | 1919.00 | 1919.00 | PASSED | NONE |
| CREDIT AMOUNT | 0.00 | 0.00 | PASSED | NONE |

*FIG. 5*

FRAMEWORK FOR TESTING AND VALIDATING CONTENT GENERATED BY APPLICATIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Service-oriented systems (also referred to herein as "service provider networks", or just "provider networks") comprise a variety of types of computing-related resources and/or services for executing a variety of tasks on behalf of a customer. Such tasks can include, for instance, executing code (e.g., an application/user function) on behalf of the customer, executing queries for the customer, and the like.

BRIEF DESCRIPTION OF DRAWINGS

Various embodiments in accordance with the present disclosure will be described with reference to the drawings, in which:

FIG. 2 is an illustration of an exemplary test specification for testing the functionality of an application provided by the provider network, in accordance with an embodiment of the present disclosure.

FIG. 3 is an exemplary illustration of object types and object definitions related to objects to be validated in a test specification, in accordance with an embodiment of the present disclosure.

FIG. 4 is an exemplary illustration of a validation report related to an object validated by the content validation service of the provider network, according to some embodiments.

FIG. 5 is an exemplary illustration of multiple validation reports generated by the content validation service of the provider network, according to some embodiments.

DETAILED DESCRIPTION

Figure 1:
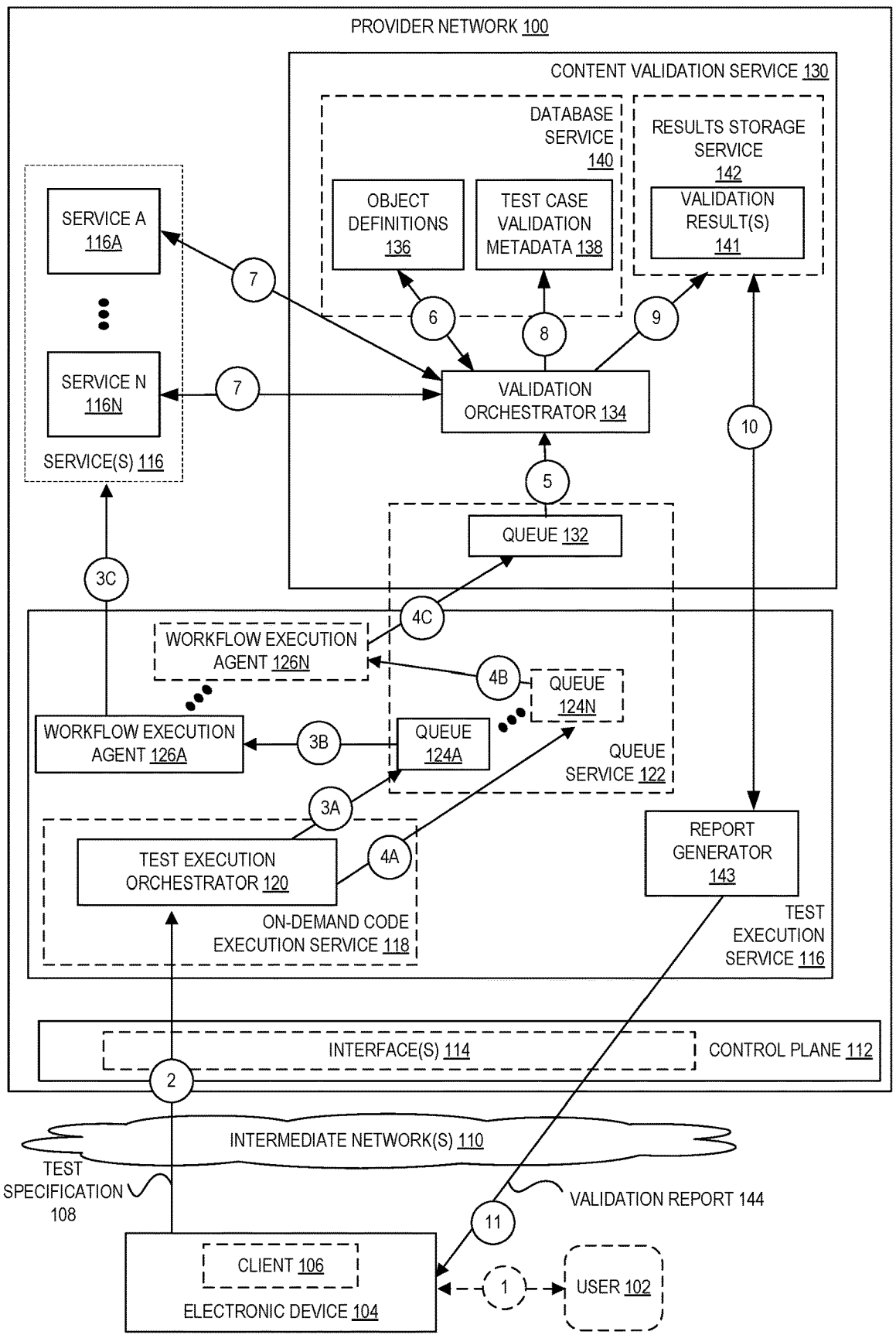
FIG. 1 is a diagram illustrating a framework for testing and validating content generated by applications provided by a provider network, according to some embodiments.

Various embodiments for a framework for testing and validating content generated by applications provided by a provider network are described. According to some embodiments, a test execution service is disclosed that provides users with a framework for testing the functionality of an application provided by a provider network. According to some embodiments, a content validation service is disclosed that provides users with a framework for validating content generated by the application by orchestrating the execution of objects to be validated as part of validating content generated by the application. The content validation service generates a validation result for a user by comparing expected data values corresponding to an object to be validated with corresponding actual data values. The content validation service provides users with the ability to define objects and object definitions for objects to be validated as part of validating content generated by applications provided by the provider network.

Testing of applications is an increasingly important part of the application development process. Testing is an essential process by which the usability and performance of an application can be evaluated to ensure the delivery of a high-quality product to end-users of a provider network. At various stages in the development cycle, a suite of tests may be run to verify the expected operation of an application. The suite of tests may include, for example, tests to verify that the application is performing as expected. As described herein, an application may refer to a function which can be a portion of code, a compiled or interpreted application, a set of procedures or routines, etc., that can be run or executed using one or more computing resources in a provider network.

Application testing can be performed during various phases of the application development process. For instance, application testing can be performed when developers add new features to an application. However, testing the functionality of an application and validating content generated by the application typically requires knowledge and the interaction between multiple systems that provide data generated by the application. Oftentimes, validating content generated by an application may require the manual verification of test cases to verify that the application is performing as expected.

Embodiments of the disclosed content validation service address these and other issues by providing a framework for automatically validating content generated by an application provided by a provider network. The content validation service orchestrates the execution of objects to be validated as part of validating content generated by the application. The content validation service identifies objects to be validated from a test specification that identifies actions to be performed to test the functionality of the application. The service identifies, based on an object definition related to the object to be validated, services (or data sources) within the provider network that provide actual data values corresponding to the object to be validated. In certain embodiments, the content validation service generates a validation result by comparing expected data values specified in the test specification for the object to corresponding actual data values obtained from the services (or data sources) and provides a validation result to the user of the provider network. In certain embodiments, the content validation service provides users with the ability to create new object definitions for objects to be validated as part of validating an application and adds these objects to an object repository in the provider network.

FIG. 1 is a diagram illustrating a framework for testing and validating content generated by applications provided by a provider network, according to some embodiments. In certain embodiments, a test execution service 116 and a content validation service 130 provide a framework for automatically testing and validating content generated by applications provided by the provider network. In FIG. 1, the test execution service 116 and the content validation service 130 are shown as part of a provider network 100, though in other embodiments the services 116 and 130 may be implemented outside of a provider network 100, such as within a private or "on premise" network environment of an organization.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services (e.g., 116A to 116N), such as a hardware virtualization service that can execute compute instances, a storage service that can store data objects, a serverless execution service that can execute code (e.g., an application/user function) on behalf of a user (e.g., the user 102) etc. The users (or "customers") of provider networks 100 may utilize one or more user accounts that are associated with a customer account, though these terms may be used somewhat interchangeably depending upon the context of use. Users may interact with a provider network 100 across one or more intermediate networks 110 (e.g., the internet) via one or more interface(s) 114, such as through use of application programming interface (API) calls, via a console implemented as a website or application, etc. The interface(s) 114 may be part of, or serve as a front-end to, a control plane 112 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

In certain embodiments, the provider network 100 provides a test execution service 116 and a content validation service 130 for testing and validating content generated by applications provided by the provider network. In certain embodiments, the test execution service 116 comprises one or more components such as a test execution orchestrator 120, a queue service 122, and a content validation service 130. These components may be implemented as software, hardware, or a combination of both using one or more multiple computing devices located at one or more multiple locations in the provider network 100.

As shown at (1), a user 102 may utilize a client application 106 of an electronic device 104 to generate a test specification 108 for testing an application provided by the provider network. As noted above, an application may refer to a function which can be a portion of code, a compiled or interpreted application, a set of procedures or routines, etc., that can be run or executed using one or more computing resources in the provider network. In certain embodiments, the test specification 108 may specify one or more actions and the order in which the actions should be performed to test the functionality of the application. In certain examples, the actions may specify one or more pre-conditions that must be fulfilled prior to executing the test specification. In certain examples, the actions may specify one or more content validation blocks to be executed as part of validating content generated by the application. For instance, the content validation blocks may specify information related to a type of object whose content is to be validated prior to executing the test specification. For example, a content validation block may identify one or more data fields and a corresponding one or more expected data values related to the type of object to be validated. As an example, a test specification for an invoice application (e.g., an application that generates an invoice for a customer of a provider network based on the customer's usage of computing resources in the provider network) may specify an invoice object to be validated in a content validation block in the test specification. The invoice object may include an object definition that identifies data fields (e.g., bill amount, charge amount, tax amount, credit amount, bill description) and corresponding expected data values to be validated for the invoice object.

In some embodiments, the user 102 may utilize a user interface (UI) of the electronic device 104 to generate the test specification 108. The UI may include a text-based UI, a graphical UI (GUI), or a combination of both to enable the user to generate the test specification 108. For example, the user may input text to generate the test specification 108 or may select (e.g., via a mouse or touchscreen) graphical elements to create the test specification 108, or a combination of both. Further details about exemplary test specifications 108 will be presented later herein with regard to FIG. 2. However, continuing with FIG. 1, at (2), the test specification 108 may be received by a test execution service 116 via one or more interfaces 114 in the control plane 112. In some embodiments, the test execution service 116 may be implemented using one or more serverless functions executed by an on-demand code execution service 118. The on-demand code execution service 118 may include a "serverless" function which may include code (e.g., to implement the test execution orchestrator 120) provided by a user 102 or other entity that can be executed on demand Serverless functions may be maintained within the provider network 100 and may be associated with a particular user or account, or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In certain embodiments, the on-demand code execution service 118 may include one or more serverless functions to implement a test execution orchestrator 120, though in other embodiments the test execution orchestrator 120 may be implemented differently—e.g., as a traditional standalone application executed by a hardware virtualization service, etc. The test execution orchestrator 120 may identify the order in which the actions specified in the test specification 108 should be executed and orchestrate the execution of these actions. As noted above, the actions may include one or more pre-conditions that must be fulfilled prior to executing the test specification and one or more content validation blocks to be executed as part of validating content generated by the application. For instance, upon receiving the test specification 108, at (3A), the test execution orchestrator 120 may identify a first action to be performed and transmit a message to be placed in a queue 124A provided by a queue service 122 indicating a request to execute the action.

The queue service 122 may include a plurality of queues 124A-124N that store queued events or messages (which can be requests or other data structures, as described herein). The plurality of queues 124A-124N can be implemented using hardware, as software, or a combination of both. For example, a queue may comprise a region of memory (e.g., Random Access Memory (RAM)) or storage (e.g., a Solid-State Disk (SSD)). A queue could alternatively be a virtual storage entity, such as a bucket or folder, which may be provided by a storage virtualization service. A queue could also comprise a set of tables or records of a database. Other implementations of queues known to those of skill in the art could also be used.

In certain embodiments, the queue service 122 is a component in the provider network 100 that is capable of receiving messages generated or triggered by a variety of entities in the provider network. For instance, as described above, the queue service 122 can receive a message from the test execution orchestrator 120 indicating a need to perform a first action defined in the test specification 108 store it in a queue (e.g., 124A). In some embodiments, each queue of the queue service 122 may store messages associated with a different action (or a group or type of actions) that can be performed to test the application. For instance, a first queue 124A may store messages related to a first action defined in the test specification 108, a second queue 124B may store messages related to a second action, a third queue 124C may store messages related to a third action, and so on. In other embodiments, the queue service 122 may utilize a single queue (e.g., 124A) for storing messages related to all the actions defined in the test specification 108.

In certain embodiments, the test execution service 116 may include one or more workflow execution agents 126A-126N that obtain queued messages from the queues 124A-124N and cause them to be distributed and/or processed in a particular manner by particular services (116A-116N). Thus, upon obtaining a message associated with an action from a queue (e.g., 124A), at (3B) a workflow execution agent (e.g., 126A) may communicate with a desired service (e.g., 116A) to execute the desired action at (3C). Upon beginning processing the action or upon the completion of the processing of the action (e.g., by the test execution service or the workflow execution agent itself), the workflow execution agent 126A may cause that message to be removed from the particular queue 124A and may cause a result of the execution of the action to be provided to a storage service 142 in the provider network 100. Additionally, or alternatively, upon completion (i.e., execution) of a particular action, the service (e.g., 116A) or the workflow execution agent (e.g., 126A) may notify the test execution orchestrator 120 which then proceeds to execute the next action defined in the test specification 108. The workflow execution agents 126A-126N may be implemented in hardware, software, or a combination of both by one or more computing devices.

In certain embodiments, at (4A) the queue service 122 may receive a message from the test execution orchestrator 120 to be placed into a queue (e.g., queue 124N) indicating a need to validate content specified in a content validation block defined in the test specification 108. At (4B), the queue service 122 may obtain the queued message (or event) from the queue and transmit the message to a workflow execution agent (e.g., 126N) for execution. At (4C), the workflow execution agent 126N may forward the message to a content validation service 130 in the test execution service 116 for execution. In some embodiments, at (4C), the workflow execution agent 126N may store the message in a queue 132 associated with the queue service 122 prior to its execution by the content validation service 130. Alternatively, in some embodiments, when the queue service 122 receives a message from the test execution orchestrator 120 indicating a need to validate content specified in a content validation block (as shown at (4A)), the queue service 122 may directly store the message into queue 132 to be provided to the content validation service 130.

In certain embodiments, the content validation service 130 is a component in the provider network 100 that performs the validation of content generated by the application by executing one or more content validation blocks defined in the test specification 108. The content validation service 130 comprises one or more components such as a validation orchestrator 134, and may utilize other services such as a database service 140, an object storage service 142, etc. These components may be implemented as software, hardware, or a combination of both using one or more multiple computing devices located at one or more multiple locations in the provider network 100.

Continuing with FIG. 1, in certain embodiments, at (5), a validation orchestrator 134 in the content validation service 130 may obtain a queued message (i.e., a request to execute a content validation block) from the queue 132 and orchestrate its execution. For instance, at (6), the validation orchestrator 134 may communicate with an object definitions data store 136 (e.g., in a database service 140) to identify and/or determine the object type of an object to be validated in the content validation block defined the test specification. The object definitions data store 136 may store a variety of object types and object definitions identifying one or more data fields for objects to be validated by the content validation service 130. For instance, in the example of the invoice application discussed above, the object definitions data store 136 may store information related to an invoice object type comprising an object definition that identifies data fields (e.g., bill amount, charge amount, tax amount, credit amount, and description) specified for the invoice object type.

In certain embodiments, the object types and object definitions stored in the object definitions data store 136 may be defined by users (e.g., user 102) of the provider network. For instance, users may define new object types and corresponding object definitions for objects to be validated by the content validation service 130 and add and/or register these definitions to the object definitions data store 136. Additionally, in certain embodiments, users may write code to retrieve data generated by an application from one or more services (116A-116N) in the provider network and add this code to the object definitions data store 136. Further details about exemplary object types with corresponding object definitions will be presented later herein with regard to FIG. 3.

Upon identifying the object type of the object to be validated, the validation orchestrator 134 may identify, based on the object definition of the object type, an identifier associated with one or more services (116A-116N) within the provider network 100 that provide one or more artifacts generated by the application. As described herein, an artifact may refer to data provided by the services (116A-116N) that comprise actual data values corresponding to the object to be validated in the content validation block. In certain embodiments, the artifacts may be generated by the application based on the performance of the actions defined in the test specification. For instance, the artifacts generated by an invoice application described above may include data that corresponds to the actual values associated with the data fields (e.g., bill amount, charge amount, tax amount, credit amount, and description) specified in the object definition for the invoice object type defined in the test specification. In certain embodiments, the validation orchestrator 134 may utilize the information stored in the object definitions data store 136 to identify the services that provide the artifacts generated by the application. For instance, the validation orchestrator 134 may identify the services by performing a lookup in a data structure in the object definitions data store 136 to identify identifiers (e.g., an Internet Protocol (IP) addresses) corresponding to the services. In some examples, the services 116A-116N described herein may include one or more of network-based services (e.g., a web service), applications, functions, objects, methods (e.g., objected-oriented methods), subroutines, or any other set of computer-executable instructions.

At (7), the validation orchestrator 134 may establish a connection with one or more of the services 116A-116N based on the identifiers associated with the services and obtain the artifacts generated by the application from the services. In certain embodiments, the validation orchestrator 134 may utilize additional information stored in the object definitions data store 136 to obtain the artifacts provided by the services. For instance, this additional information may include an identifier (e.g., an IP address) associated with a service, an API definition to an endpoint defined for the service, mapping information associated with the objects and so on. Additional details about the information stored in the object definitions data store 136 will be presented later herein with regard to FIG. 3.

Continuing with the operations performed at (7), the validation orchestrator 134 may then obtain the artifacts generated by the application from the services. In certain embodiments, the validation orchestrator 134 may identify the actual data values from the artifacts based on mapping information associated with the object definition that maps the data fields with the actual data values from the artifacts. For instance, continuing with the example of the invoice application discussed above, a "bill amount" data field specified in the object definition for an invoice object type stored in the object definitions data store 136 may correspond to a "bill amt" value in the artifacts provided by a service that includes the actual data values corresponding to the bill amount data field specified in the object definition. In this situation, the validation orchestrator may utilize mapping information stored in the object definitions data store 136 to identify that the "bill amt" value in the artifacts comprises the actual data values corresponding to the "bill amount" data field specified in the object definition. The validation orchestrator 134 may then compare the expected data values specified in the content validation block to the corresponding actual data values obtained from the artifacts to generate a validation result 141.

In certain embodiments, at (8), upon generating the validation result, the validation orchestrator 134 may communicate a status of the validation result to a test case validation metadata datastore 138. For instance, the status may be an indicator (e.g., "complete") provided to the test case validation metadata datastore 138 that the content specified in the content validation block in the test specification 108 has been successfully validated. Other status values may additionally or alternatively be used, such as "in progress", "failed", and so on. At (9), the validation orchestrator 134 may store the validation result in an object storage service 142. At (10), the test execution service 116 may detect the existence of the validation result stored in the object storage service (e.g., based on detecting a completion of content validation from the content validation service 130) and obtain the validation result from the object storage service 142. At (11), the test execution service may transmit the validation result 146 to the client. In certain embodiments, the test execution service 116 may include a report generator 143 that transforms the validation result into a validation report 144 prior to transmission to the client. For example, the report generator 143 may transform the validation result into a validation report 144 in a format that is suitable to the client such as eXtensible Markup Language (XML), JavaScript Object Notation (JSON), etc. Further details regarding the manner in which a validation report 144 can be generated and presented to users of the provider network will be presented later herein with regard to FIGS. 4-5.

FIG. 2 is an illustration of an exemplary test specification for testing the functionality of an application provided by the provider network, in accordance with an embodiment of the present disclosure. In certain embodiments, the test specification 200 may be generated by a user (e.g., 102) of the provider network via a user interface of an electronic device 104. In the example shown, the test specification 200 may test the functionality of an invoice application that generates an invoice for a customer of the provider network based on the customer's usage of computing resources in the provider network.

As shown, the test specification 200 specifies one or more actions 202 to be performed to test the application. The actions 202 may specify one or more pre-conditions that must be fulfilled prior to executing the test specification. For instance, the actions 202 may include a first action—"create account" that registers a user to the provider network, a second action—"create payment instrument" that provides a method of payment to be used by the user (e.g., while subscribing to a service provided by the provider network), a third action—"create subscription" that generates subscription information for the user, a fourth action—"add usage" that adds usage information regarding the services and/or computing resources that will be utilized by the user, and a fifth action—"bill run" that generates an invoice (bill) for the user upon completion of the actions defined in the test specification.

In certain embodiments, the test specification 200 may specify a content validation block 204 for validating content generated by the invoice application. A content validation block 204 identifies one or more data fields and a corresponding one or more expected data values for an object type of an object to be validated. In this illustrated example, the content validation block 204 identifies data fields—a bill amount, charge amount, tax amount, credit amount, bill description, and corresponding expected data values to be validated for an invoice object generated by the invoice application.

The test specification 200 is an exemplary illustration of a test specification generated by a user to test an invoice application provided by the provider network. In alternate embodiments, various other test specifications may be generated by users to test other applications provided by the provider network. For instance, a user may generate a test specification to test an account application provided by the provider network. Such a test specification may specify actions to create an account, create a payment instrument for the account, specify a preferred payment currency for the account, identify subscriptions for the account, and so on. The test specification may further include one or more content validation blocks to validate the account creation process, validate the account creation date, validate the payment instruments for the account, validate the preferred payment currency for the account, verify the number of subscriptions for the account and so on. Further, it is to be understood that the test specification shown in FIG. 2 is only one representation of a test specification used to implement some embodiments, and various alternate formulations with more or fewer actions and content validation blocks in different orderings and/or formats could alternatively be used and implemented by one of ordinary skill in the art in possession of this disclosure to implement the various embodiments described herein.

FIG. 3 is an exemplary illustration of object types and object definitions related to objects to be validated in a test specification, in accordance with an embodiment of the present disclosure. In certain embodiments, the object definitions data store 136 shown in FIG. 1 may store information related to objects to be validated in a test specification. This information may include, for instance, an object type of the object to be validated and an object definition (identifying one or more data fields) for the object. For instance, the example shown illustrates object types and object definitions for an invoice object, an account object, and a subscription object respectively. For example, the object definition for an invoice object type may specify data fields such as a bill amount, charge amount, tax amount, credit amount, and description associated with the invoice object type. Similarly, the object definition for an account object type may specify data fields such as an account identifier, an account creation date, and account information associated with the account object type. In certain examples, the object definition for an account object type may specify additional data fields such as an account address, a location (e.g., city, state, country) where the account was created, and a zip code for the account. The object definition for a subscription object may specify data fields such as an account identifier, an offer identifier, an offer code, a begin date, and end date, a cardinality, an availability zone, and state information associated with the subscription object type.

In certain embodiments, the object definitions data store may store information related to identifiers (e.g., an IP address) associated with one or more services 116A-116N within the provider network that provide the artifacts generated by the application, API definitions that may be invoked to communicate with the services, and/or mapping information that maps one or more (or all) of the data fields in the object definition with the actual data values from the artifacts provided by the services to identify the actual data values from the artifacts. For instance, an API call (e.g., getBillIdWithAmount) can be invoked to obtain artifacts generated by an invoice application from one of the services (e.g., service 116A). Similarly, an API call (e.g., getAccountInfoByAccId) can be invoked to obtain artifacts generated by an account application from the services. In certain embodiments, mapping information may be used to identify and obtain the actual data values from the artifacts. For instance, a "bill amount" data field specified in the object definition for an invoice object type stored in the object definitions data store 136 may map to a "bill amt" value in the artifacts provided by a service that includes the actual data values corresponding to the "bill amount" data field specified in the object definition. In some embodiments, not all of the data fields specified in the object definition may need to be defined in the mapping information. For example, in some examples it may be the case that the object definition data field name may directly correspond to a data field name within an artifact. In such a case, it may not be necessary to explicitly provide mapping information, and thus the mapping may be implicit.

It is to be understood that the object types and object definitions shown in FIG. 3 is only one representation of object types and object definitions used to implement some embodiments, and various alternate formulations with more or fewer data fields in different orderings could alternatively be used and implemented by one of ordinary skill in the art in possession of this disclosure to implement the various embodiments described herein.

FIG. 4 is an exemplary illustration of a validation report 400 related to an object validated by the content validation service of the provider network, according to some embodiments. In certain embodiments, the validation report 400 may be generated by the test execution service 116 (shown in FIG. 1) when it receives a validation result from the content validation service 130. As discussed in relation to FIG. 1, a validation result may be generated based on a comparison of the expected data values specified in the content validation block to the corresponding actual data values obtained from the artifacts provided by the services (e.g., 116A-116N). In certain embodiments, a user (e.g., 102) may view the validation report via a GUI in the electronic device.

The example shown illustrates an exemplary validation report 400 generated based on validating an invoice object in a content validation block specified in a test specification. As shown in FIG. 4, the validation report 400 may include an attribute column that specifies the data fields associated with the invoice object, an expected value column that specifies the expected data values for the data fields, an actual value column that specifies the actual data values obtained from the artifacts, a validation result column that specifies whether the expected data values correspond to the actual data values, and/or a comments column that specifies a narrative to the user regarding the validation result obtained for a particular data field associated with the invoice object. In certain examples, the validation results specified in the validation result column may include a pass and/or fail criterion that specifies whether or not the content validation of the object was successful. In other examples, the validation result column may include additional or alternate criteria such as an expected passed result, an expected failed result, an unexpected failed result, and so on.

It is to be understood that the validation report shown in FIG. 4 is only one representation of a validation report used to implement some embodiments, and various alternate formulations with more or fewer data columns in different orderings could alternatively be used and implemented by one of ordinary skill in the art in possession of this disclosure to implement the various embodiments described herein.

FIG. 5 is an exemplary illustration of multiple validation reports generated by the content validation service of the provider network, according to some embodiments. In certain embodiments, the validation reports 500 may be generated by the test execution service 116 when it receives validation results from the content validation service 130. As discussed in relation to FIG. 1, a validation result may be generated based on a comparison of the expected data values specified in the content validation block to the corresponding actual data values obtained from the artifacts provided by the services (e.g., 116A-116N). In certain embodiments, a user (e.g., 102) may view the validation reports via a GUI in the electronic device. As shown in FIG. 1, upon selection of a particular validation report 502, the user may view details pertaining to the particular validation report 502 in a second panel of the GUI. For instance, by selecting a user interface element corresponding to validation report 502, a user may be able to view that the actual value ("19000.00") for the "charge amount" attribute did not match its expected value ("19001.00").

Figure 6:
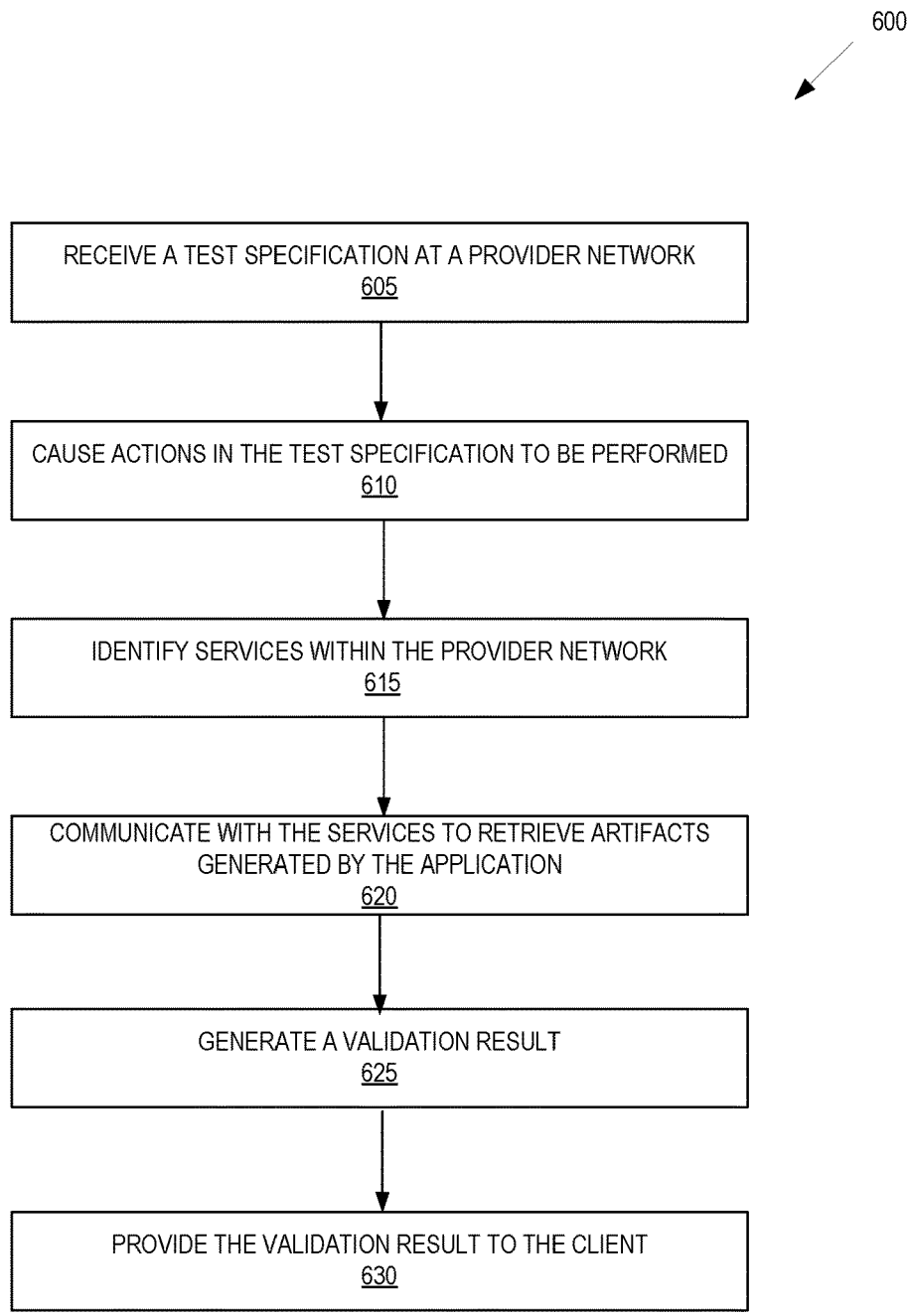
FIG. 6 is a flow diagram illustrating operations 600 of a method for testing and validating content generated by an application provided by the provider network according to some embodiments.

FIG. 6 is a flow diagram illustrating operations 600 of a method for testing and validating content generated by an application provided by the provider network according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the test execution service 116 and the content validation service 130 of FIG. 1.

The operations 600 include, at block 605, receiving a test specification at a provider network. The test specification may be originated by a client (e.g., 106) in an electronic device (e.g., 104) by a user (e.g., 102) of the provider network. The test specification may identify one or more actions to be performed to test the application. As noted above, the actions may specify one or more pre-conditions that must be fulfilled prior to executing the test specification and one or more content validation blocks to be executed as part of validating content generated by the application. In some examples, the content validation blocks may identify one or more data fields related to a type of object whose content is to be validated and a corresponding one or more expected data values.

The operations 600 further include, at block 610, causing the actions to be performed. In certain embodiments, the operations at block 610 may include sending a first message to a first queue (e.g., 124A) provided by a queue service (e.g., 122) of the provider network. For instance, the first message may indicate a need to perform a first action of the one or more actions defined in the test specification. The operations at block 610 may further include causing a transmission of the first message from the first queue to a first workflow execution agent (e.g., 126A) in the provider network by the queue service. The operations at block 610 may further include causing the execution of the first action by the first workflow execution agent.

In certain embodiments, the operations at block 610 may include sending a second message indicating a need to validate content specified in the content validation block of the test specification to a second queue (e.g., 124N) provided by the queue service. The operations at block 610 may further include causing a transmission of the second message from the second queue to a second workflow execution agent (e.g., 126N) in the provider network. The operations at block 610 may further include causing, by the second workflow execution agent, the validation of the content.

The operations 600 further include, at block 615, identifying one or more services within the provider network that provide one or more artifacts generated by the application. For example, block 615 may include identifying the services by performing a lookup in a data structure in the object definitions data store (e.g., 134) to identify IP addresses corresponding to the services. As noted above, an artifact may refer to data provided by the services 116A-116N that comprise actual data values corresponding to the object to be validated in the content validation block. In certain embodiments, the artifacts may be generated by the application based on the performance of the actions defined in the test specification.

In certain embodiments, the operations at block 615 may include identifying, based on the test specification, an object type of an object to be validated in the content validation block. The operations at block 615 may include, for instance, identifying an object type identifier in the object definition of the object to be validated and/or identifying the data fields to be validated based on the object type. For instance, in the example of the invoice application discussed above, an object definition for an "invoice" object may include data fields such as a bill amount, charge amount, tax amount, credit amount, and description to be validated. The operations at block 615 may further include identifying, based on the object definition, an identifier associated with the services.

The operations 600 may further include, at block 620, communicating with the services to retrieve the artifacts generated by the application. The operations at block 620 may include establishing a connection with the services based on the identifier associated with the one or more services and obtaining the artifacts generated by the application from the services.

The operations 600 may further include, at block 625, generating a validation result by comparing the expected data values specified in the content validation block to corresponding actual data values obtained from the artifacts. In some examples, the expected data values specified in the content validation block may directly correspond to the actual data values obtained from the artifacts. In this case, the operations at block 625 may include identifying, based on the test specification, an object type of an object to be validated in the content validation block, identifying the actual data values from the artifacts based on the object definition of the object type and comparing the expected data values with the actual data values to generate the validation result. In other examples, the expected data values may not directly correspond to the actual data values. In this case, the operations at block 625 may include applying mapping information to obtain the actual data values from the artifacts. For instance, the mapping information may specify a tolerance level (or a rounding condition or fuzzy logic) that can be applied to map the expected data values to the actual data values. In some examples, the expected data values specified in the content validation block of a test specification may correspond to individual data values associated with the object type of an object to be validated. For instance, the expected data values may correspond to expected data values of individual sub accounts (child accounts) corresponding a parent account object to be validated. In this case, the operations at block 625 may include determining if the expected data values from the individual sub accounts, when combined (or added) result in the actual data value corresponding to the parent account object.

The operations 600 may further include, at block 630, providing the validation result to the client. In some examples, the operations at block 630 may include generating a validation report for the user. As noted above, a user (e.g., 102) may view the validation report via a GUI provided by the electronic device.

Figure 7:
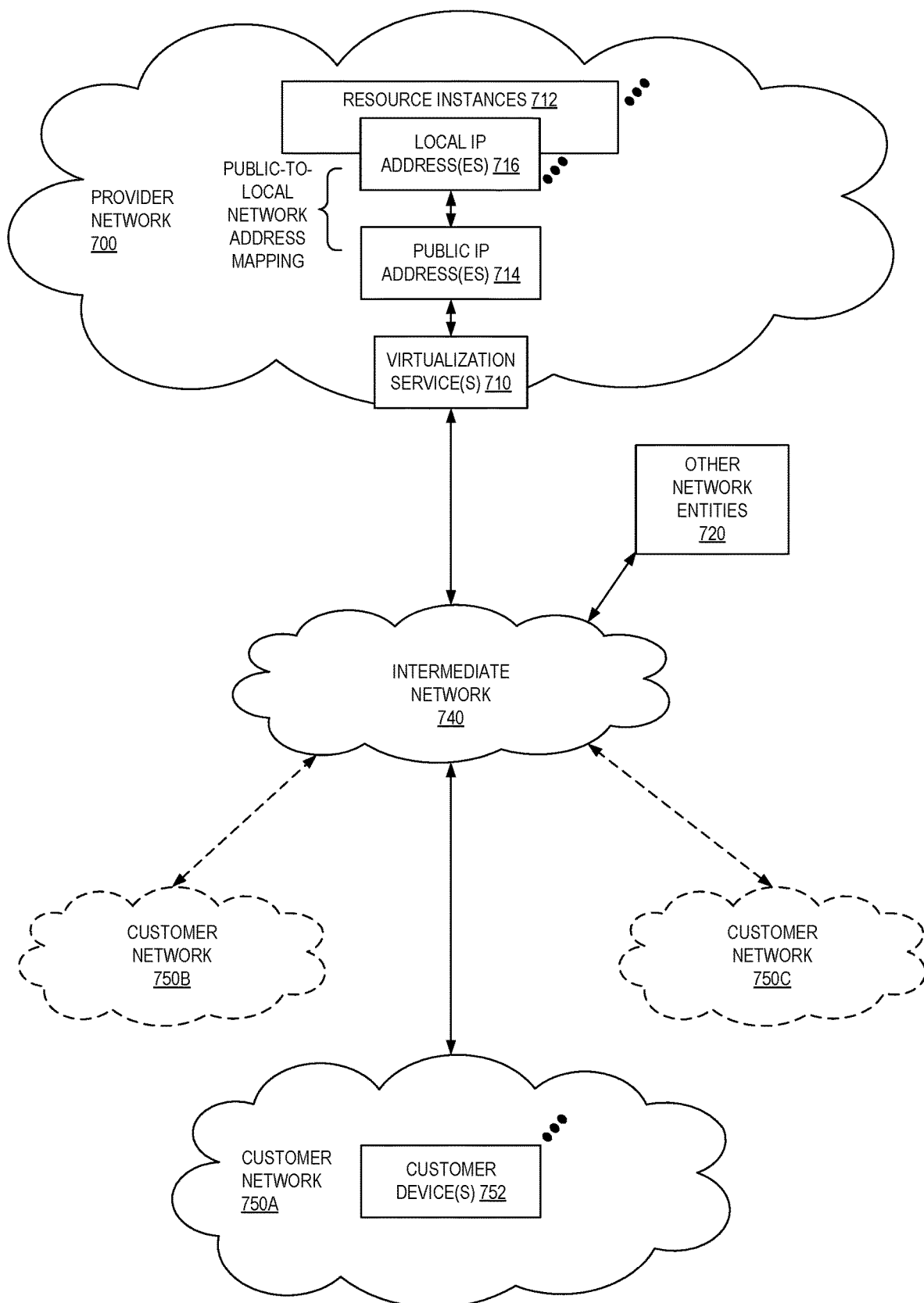
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
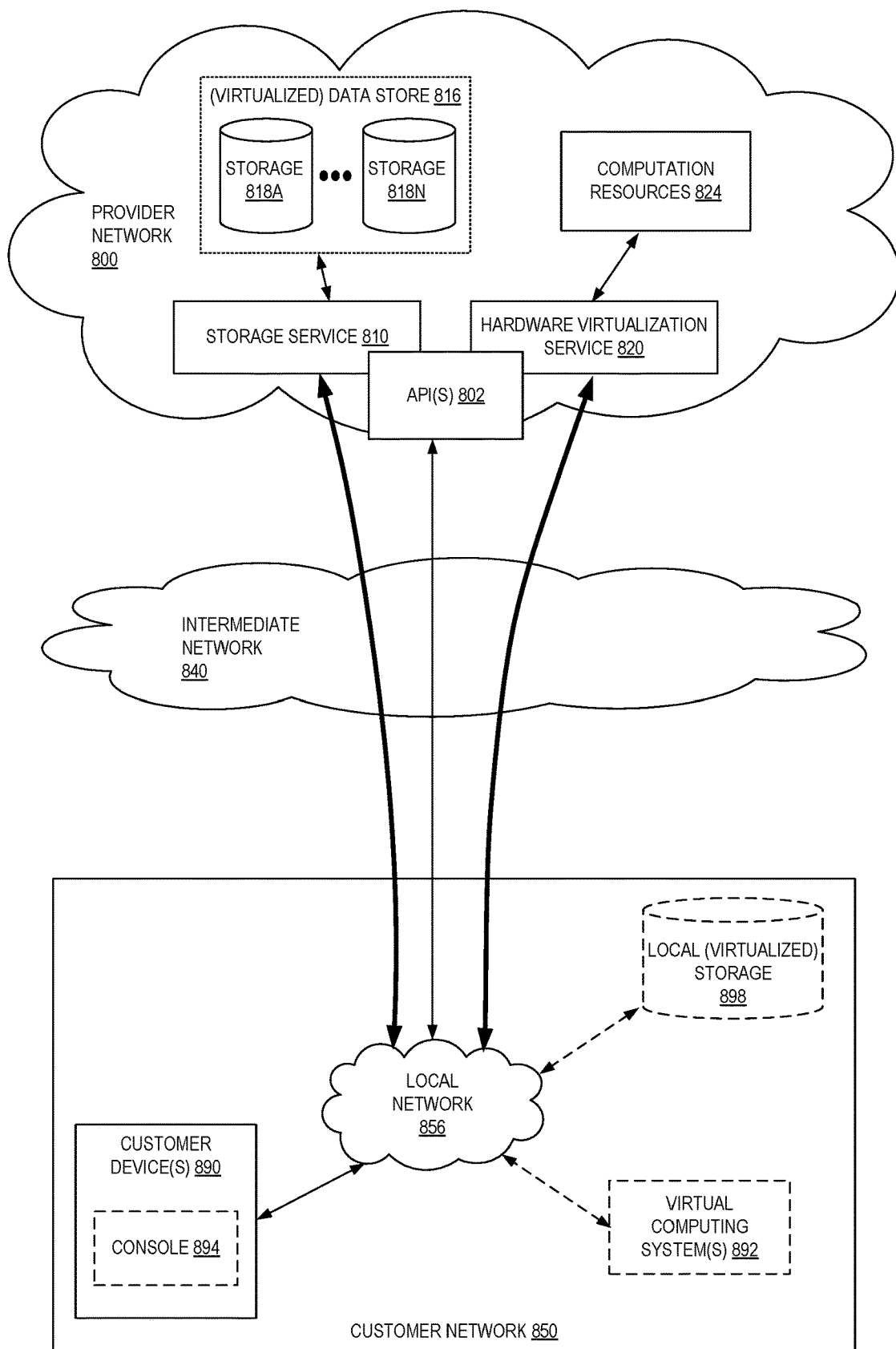
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
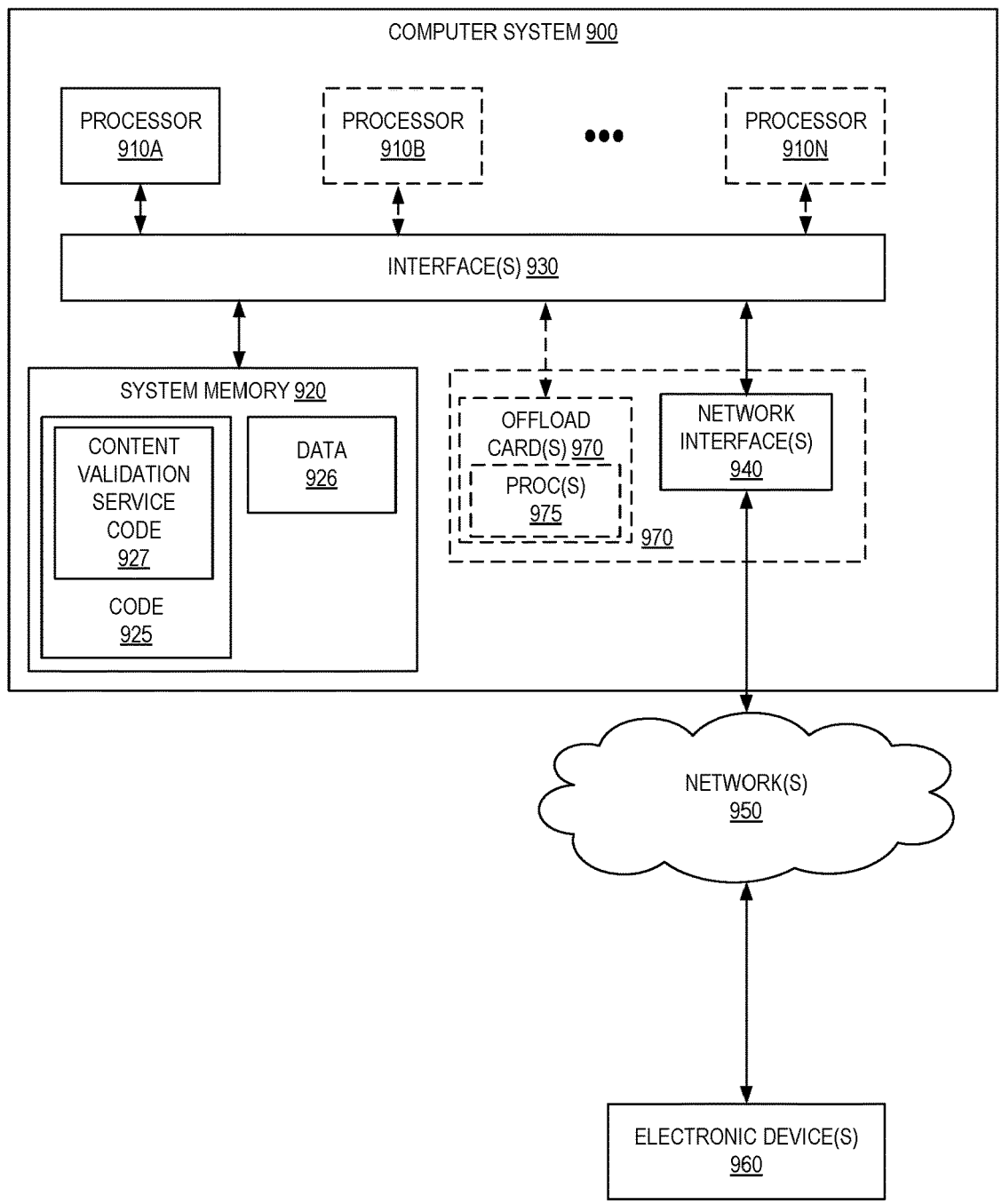
FIG. 9 is a block diagram illustrating an example computer system that may be used in some embodiments.

In some embodiments, a system that implements a portion or all of the techniques for testing and validating content generated by applications as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926. In certain examples, the code 925 could include content validation service code 927 for validating content generated by applications.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a test specification at a provider network, the test specification being originated by a client and specifying a content validation block to be used as part of validating content generated by an application of the provider network, the content validation block identifying one or more data fields and a corresponding one or more expected data values, wherein the test specification further identifies one or more actions to be performed to test the application;
causing the one or more actions to be performed;

identifying, based on the test specification, one or more services within the provider network;

communicating with the one or more services to retrieve one or more artifacts generated by the application, wherein the artifacts are generated by the application based on performance of the one or more actions;

generating a validation result, the generating including comparing the one or more expected data values specified in the content validation block to a corresponding one or more actual data values obtained from the one or more artifacts; and providing the validation result to the client.

2. The computer-implemented method of claim 1, wherein identifying the one or more services comprises:

identifying, based on the test specification, an object definition of an object to be validated in the content validation block, the object definition identifying the one or more data fields; and identifying, based on the object definition, an identifier associated with the one or more services, wherein the one or more services provide the one or more artifacts generated by the application, and wherein the artifacts comprise the one or more actual data values corresponding to the object to be validated in the content validation block.

3. The computer-implemented method of claim 2, wherein communicating with the one or more services comprises:

establishing a connection with the one or more services based on the identifier associated with the one or more services; and obtaining the one or more artifacts generated by the application from the one or more services.

4. A computer-implemented method comprising:

receiving a test specification at a provider network, the test specification being originated by a client and specifying a content validation block to be used as part of validating content generated by an application of the provider network, the content validation block identifying one or more data fields and a corresponding one or more expected data values;

identifying, based on the test specification, one or more services within the provider network;

communicating with the one or more services to retrieve one or more artifacts generated by the application, wherein the artifacts are generated by the application based on performance of one or more actions;

generating a validation result, the generating including comparing the one or more expected data values specified in the content validation block to a corresponding one or more actual data values obtained from the one or more artifacts; and providing the validation result to the client.

5. The computer-implemented method of claim 4, wherein identifying the one or more services comprises:

identifying, based on the test specification, an object definition of an object to be validated in the content validation block, the object definition identifying the one or more data fields; and identifying, based on the object definition, an identifier associated with the one or more services, wherein the one or more services provide the one or more artifacts generated by the application, and wherein the one or more artifacts comprise the one or more actual data values corresponding to the object to be validated in the content validation block.

6. The computer-implemented method of claim 5, wherein communicating with the one or more services comprises:

establishing a connection with the one or more services based on the identifier associated with the one or more services; and obtaining the one or more artifacts generated by the application from the one or more services via the connection.

7. The computer-implemented method of claim 4, wherein generating the validation result comprises:

identifying, based on the test specification, an object definition of an object to be validated in the content validation block, the object definition identifying the one or more data fields;

identifying the one or more actual data values from the one or more artifacts based on the object definition; and comparing the one or more expected data values with the one or more actual data values.

8. The computer-implemented method of claim 7, wherein the one or more actual data values from the one or more artifacts are identified based on mapping information associated with the object definition, wherein the mapping information maps the one or more data fields with the one or more actual data values from the one or more artifacts.

9. The computer-implemented method of claim 4, further comprising:

receiving a request from a user of the provider network to create an object definition for an object type of an object to be validated as part of validating the application, wherein the object definition identifies the one or more data fields specified in the content validation block; and adding the object type and the object definition to an object repository in the provider network.

10. The computer-implemented method of claim 4, further comprising:

identifying, based on the test specification, the one or more actions to be performed to test the application; and causing the one or more actions to be performed.

11. The computer-implemented method of claim 10, wherein causing the one or more actions to be performed comprises:

sending, to a first queue provided by a queue service of the provider network, a first message indicating a need to perform a first action of the one or more actions defined in the test specification;

causing, by the queue service, a transmission of the first message from the first queue to a first workflow execution agent in the provider network; and causing, by the first workflow execution agent, the execution of the first action.

12. The computer-implemented method of claim 11, further comprising:

sending, to a second queue provided by the queue service, a second message indicating a need to validate content specified in the content validation block of the test specification.

13. The computer-implemented method of claim 12, further comprising:

causing, by the queue service, a transmission of the second message from the second queue to a second workflow execution agent in the provider network; and causing, by the second workflow execution agent, the validation of the content.

14. The computer-implemented method of claim 11, wherein the first queue is one of a plurality of queues provided by the queue service that each stores messages associated with a different action that can be performed to test the application.

15. A system comprising:
a test execution service implemented by a first one or more electronic devices of a provider network, the test execution service including instructions that upon execution cause the test execution service to receive a test specification at the provider network, the test specification being originated by a client and specifying a content validation block to be used as part of validating content generated by an application of the provider network, the content validation block identifying one or more data fields and a corresponding one or more expected data values; and
a content validation service implemented by a second one or more electronic devices, the content validation service including instructions that upon execution cause the content validation service to:
identify, based on the test specification, one or more services within the provider network;
communicate with the one or more services to retrieve one or more artifacts generated by the application, wherein the artifacts are generated by the application based on performance of one or more actions;
generate a validation result, including comparing the one or more expected data values specified in the content validation block to a corresponding one or more actual data values obtained from the one or more artifacts; and
provide the validation result to the client.

16. The system of claim 15, wherein the instructions upon execution further cause the content validation service to:
identify, based on the test specification, an object definition of an object to be validated in the content validation block, the object definition identifying the one or more data fields; and
identify, based on the object definition, an identifier associated with the one or more services, wherein the one or more services provide the one or more artifacts generated by the application, and wherein the artifacts comprise the one or more actual data values corresponding to the object to be validated in the content validation block.

17. The system of claim 16, wherein the instructions upon execution further cause the content validation service to:
establish a connection with the one or more services based on the identifier associated with the one or more services; and
obtain the one or more artifacts generated by the application from the one or more services.

18. The system of claim 15, wherein the instructions upon execution further cause the content validation service to:
identify, based on the test specification, an object definition of an object to be validated in the content validation block, the object definition identifying the one or more data fields;
identify the one or more actual data values from the one or more artifacts based on the object definition; and
compare the one or more expected data values with the one or more actual data values to generate the validation result.

19. The system of claim 18, wherein the one or more actual data values from the one or more artifacts are identified based on mapping information associated with the object definition, wherein the mapping information maps the one or more data fields with the one or more actual data values from the one or more artifacts.

20. The system of claim 15, wherein the instructions upon execution further cause the content validation service to:
receive a request from a user of the provider network to create an object definition for an object type of an object to be validated as part of validating the application, wherein the object definition identifies the one or more data fields specified in the content validation block; and
add the object type and the object definition to an object repository in the provider network.

* * * * *